US006981085B2

(12) United States Patent
Tree et al.

(10) Patent No.: US 6,981,085 B2
(45) Date of Patent: Dec. 27, 2005

(54) CARRYING CASE FOR PORTABLE ELECTRONIC DEVICES

(75) Inventors: John Tree, London (GB); Ronald Leroy Lytel, New York, NY (US)

(73) Assignees: Sony Electronics, Inc., Park Ridge, NJ (US); Sony Corporation, (JP)

( * ) Notice: Subject to any disclaimer, the term of this patent is extended or adjusted under 35 U.S.C. 154(b) by 570 days.

(21) Appl. No.: 09/808,349

(22) Filed: Mar. 15, 2001

(65) Prior Publication Data

US 2002/0133659 A1 Sep. 19, 2002

(51) Int. Cl.[7] ............................................ G06F 13/00
(52) U.S. Cl. ...................... 710/300; 710/300; 206/320; 206/576; 361/600; 150/165
(58) Field of Search ................................ 710/300, 100, 710/301, 302, 303, 304, 2; 361/686, 737, 361/814, 142, 600; 379/402; 708/109; 340/539.11, 340/7.63, 693.5; 455/557, 575.1, 90.3, 128; 206/320, 365, 576; 700/17; 383/112; 150/161, 150/162, 165

(56) References Cited

U.S. PATENT DOCUMENTS

| | | | |
|---|---|---|---|
| 4,006,764 A * | 2/1977 | Yamamoto et al. ......... | 206/320 |
| 4,658,956 A * | 4/1987 | Takeda et al. .............. | 206/320 |
| 4,790,431 A * | 12/1988 | Reel et al. ................ | 312/223.2 |
| 4,879,759 A * | 11/1989 | Matsumoto et al. ........ | 455/348 |
| 5,059,970 A * | 10/1991 | Raubenheimer et al. ..................... | 340/995.26 |
| 5,105,335 A * | 4/1992 | Honda ........................ | 361/679 |
| 5,313,596 A * | 5/1994 | Swindler et al. ............ | 710/303 |
| 5,325,139 A * | 6/1994 | Matsumoto .................. | 396/27 |
| 5,353,017 A * | 10/1994 | Suzuki et al. .............. | 340/7.37 |
| 5,386,084 A * | 1/1995 | Risko ........................ | 174/52.3 |
| 5,437,367 A * | 8/1995 | Martin ....................... | 206/320 |
| 5,490,213 A * | 2/1996 | Huang ......................... | 379/442 |
| 5,497,339 A * | 3/1996 | Bernard ...................... | 708/109 |
| 5,528,248 A * | 6/1996 | Steiner et al. ......... | 342/357.06 |
| 5,586,002 A * | 12/1996 | Notarianni .................. | 361/681 |
| 5,642,102 A * | 6/1997 | Panther et al. ............. | 340/7.55 |
| 5,864,708 A * | 1/1999 | Croft et al. .................... | 710/1 |
| 5,956,291 A * | 9/1999 | Nehemiah et al. .......... | 367/131 |
| 6,005,368 A * | 12/1999 | Frame ........................ | 320/113 |
| 6,138,041 A * | 10/2000 | Yahia ....................... | 455/569.2 |

(Continued)

FOREIGN PATENT DOCUMENTS

DE          3442753 A1 *  5/1986  ............ G06C 5/02

OTHER PUBLICATIONS

Digital Multimedia Networks, "Consumer Audio/Video Equipment-Digital Interface (IEC 61883)" http://www.dmn.at/info/iec61883/iec61883-en.html.*

(Continued)

*Primary Examiner*—Tim Vo
*Assistant Examiner*—Justin King
(74) *Attorney, Agent, or Firm*—Rader, Fishman & Grauer, PLLC; Ronald P. Kananen

(57) ABSTRACT

A case for an electronic device, which includes a first protective material that maintains the electronic device within the case, and at least one controlling interface that is in electrical communication with said electronic device, and disposed on the first protective material. Through the controlling interface, the user can operate an electronic feature of the electronic device. Electrical communication between the controlling interface and the electronic device can be carried out, at least in part using wireless communication means. Further, a connection port can included for transferring electrical signals between the electronic device and the controlling interface. The connection port can be attached to the first protective material to avoid separation of the port from the case.

25 Claims, 4 Drawing Sheets

U.S. PATENT DOCUMENTS

| | | | |
|---|---|---|---|
| 6,148,353 A * | 11/2000 | Cho | 710/303 |
| 6,442,637 B1 * | 8/2002 | Hawkins et al. | 710/300 |
| 6,600,657 B1 * | 7/2003 | Yerazunis et al. | 361/737 |
| 6,633,482 B2 * | 10/2003 | Rode | 361/686 |
| 6,646,866 B2 * | 11/2003 | Kao | 361/683 |
| 6,657,654 B2 * | 12/2003 | Narayanaswami | 348/14.04 |
| 2002/0139822 A1 * | 10/2002 | Infanti | |
| 2003/0081375 A1 * | 5/2003 | Yamamoto | 361/681 |
| 2003/0089832 A1 * | 5/2003 | Gold | |

OTHER PUBLICATIONS

CompUSA, Black leather case for Sony CLIE T415/T615 Handhelds, http://www.compusa.com/products/product_info.asp?product_code=50223448&pfp=BRO.*

* cited by examiner

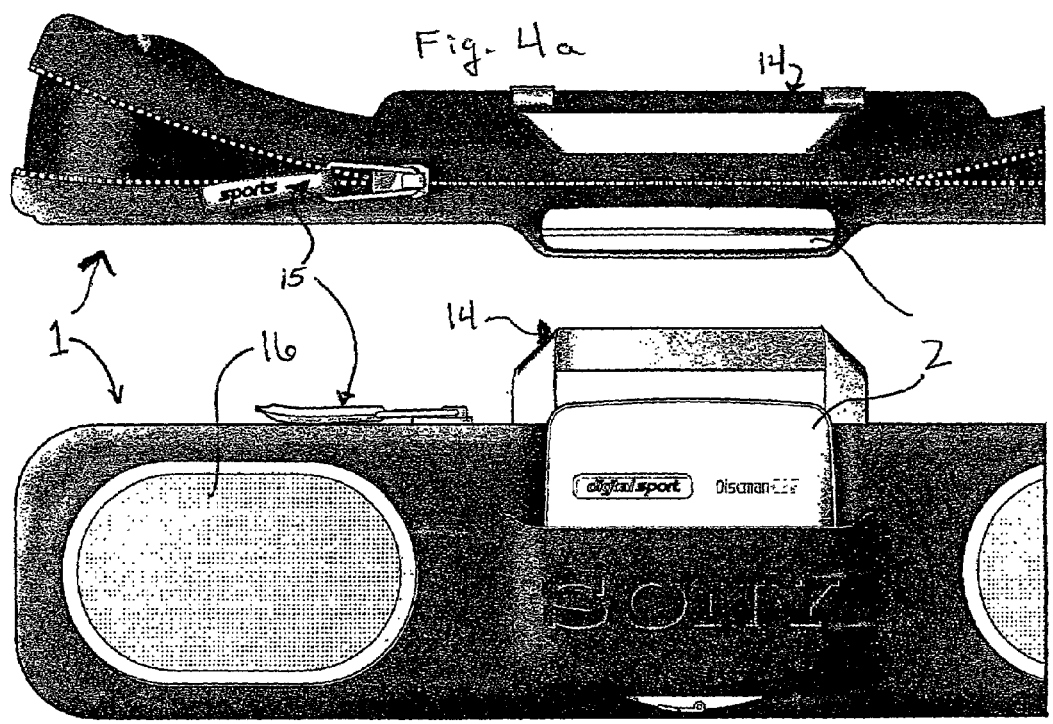

CARRYING CASE FOR PORTABLE ELECTRONIC DEVICES

FIELD OF THE INVENTION

The present invention relates to portable electronic devices. More particularly, the present invention relates to protective cases for portable electronic devices such as audio devices, video devices, pagers, telephones, cameras, electronic planners, computer processors, and the like.

BACKGROUND OF THE INVENTION

As technology is providing smaller circuitry and enhanced performance, electronic devices are become smaller and more portable. Yet, with the decreasing size of electronic devices, often times the devices become more fragile. Attempts have been made at making the devices using protective and durable materials to keep the electronic devices from being damaged due to mechanical shock, exposure to the elements, etc. To further protect the devices, many protective cases have been made that are designed to fit around specific electronic devices.

There are two types of existing cases. First, there is the type of protective case that surrounds all or most of entire electronic device in an attempt to protect the device from heat, water, shock, etc. However, these cases tend to make it difficult to manipulate the electronics inside of the case. To adjust a setting in the electronic device the user must either open the case and remove the device, or use a remote controller. Second, there is the type of protective case that leaves holes in the casing to allow the user to touch buttons or knobs on the device. The obvious problem with these cases is the inability of the case to fully protect the device contained therein because the device is at least partially exposed.

Finally, it is somewhat frustrating for users to buy a portable electronic device, only to find out that a later produced model of the device better suits their needs. Users then face the dilemma of either buying another advanced version of the device, or to make do with their original purchase.

From the above discussion, it is clear that there is a need in the art for a means for protecting and enhancing the functionality and/or cosmetic appeal of portable electronic devices while overcoming at least the above-discussed problems associated with existing carrying cases.

SUMMARY OF THE INVENTION

It is an object of the present invention to meet the above-described needs and others. Specifically, it is an object of the present invention to provide a case for an electronic device, which includes a first protective material that maintains the electronic device within the case, and at least one controlling interface that is in electrical communication with said electronic device, and disposed on the first protective material. Through the controlling interface, the user can operate an electronic feature of the electronic device.

Electrical communication between the controlling interface and the electronic device can be carried out, at least in part using wireless communication means. Further, a connection port can included for transferring electrical signals between the electronic device and the controlling interface. The connection port can be attached to the first protective material to avoid separation of the port from the case.

The case should include at least one electrical output jack. The jack can be, for example, an audio output, but could also include a phone line jack that is connected with a modem, a power output jack, and so forth. The case can further include at least one audio speaker that receives audio signals from the controlling interface.

The case can also include at least one electrical input through which power is provided to either immediately provide voltage for operation of the electronic device, or to store a charge for the electronic device in a cell.

A major advantage of the present invention is the ability of the controlling interface to be adapted to produce numerous command signals, including command signals that operate functions that are not operated by command signals produced from a controlling interface of the electronic device. The case can therefore serve as an upgrade of the original electronic device, providing additional or specialized features that suits the user.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as

BRIEF DESCRIPTION OF THE DRAWINGS

The accompanying drawings illustrate the present invention and are a part of the specification. Together with the following description, the drawings demonstrate and explain the principles of the present invention.

FIG. 2a is a perspective view of an open case and an electronic device to be contained therein, according to merely one of many embodiments of the present invention.

FIG. 2b is a perspective view of a closed version of the case of FIG. 1a.

FIG. 4a is a perspective view showing the case of the present invention with a zip closure and speaker components, according to another embodiment of the present invention.

FIG. 4b is another perspective view showing the case of FIG. 4a.

DETAILED DESCRIPTION OF THE PREFERRED EMBODIMENTS

Using the drawings, the preferred embodiments of the present invention will now be explained.

Throughout the drawings and the following discussion, the device contained within the case of the present invention is designated simply as an electronic device 2. As set forth above, the electronic device 2 can be one of many portable devices such as audio devices, video devices, pagers, telephones, cameras, electronic planners, computer processors, and other electronics.

A carrying case according to a simple embodiment of the present invention is shown in the accepting position in FIG.

Figures 2A, 2B:
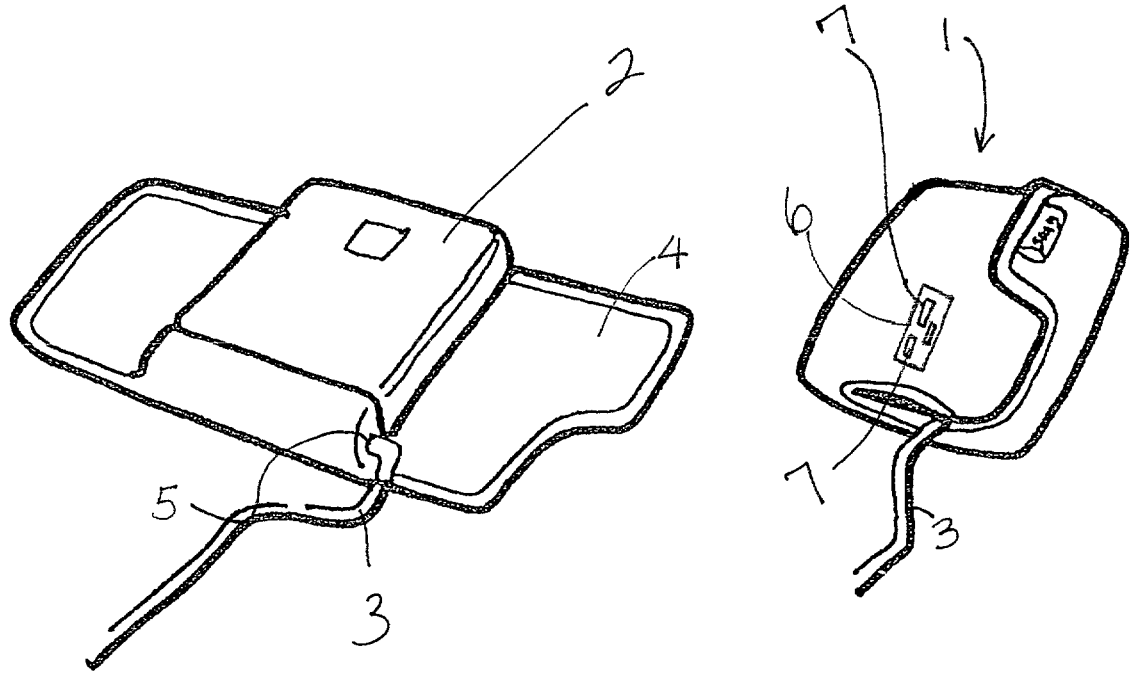
Figure 3:
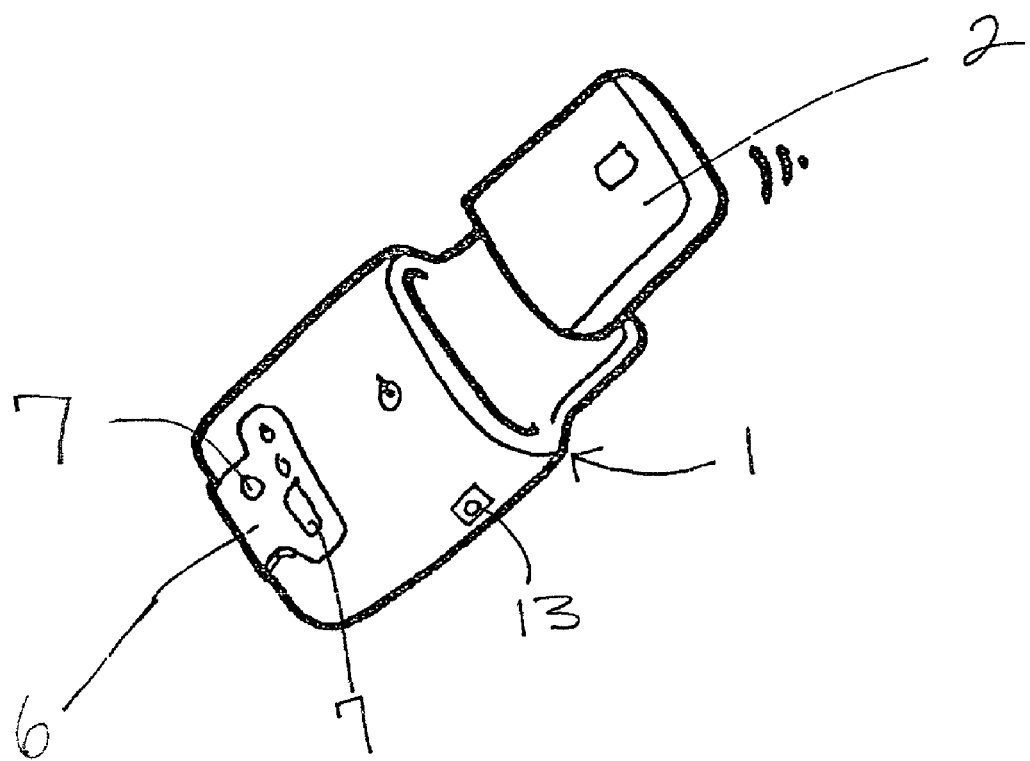
FIG. 3 is a view of merely one of many embodiments of the case of the present invention, along with an electronic device to be contained in the case and controlled by an outer controlling interface provided on the case.

2a, and in the enclosing position in FIG. 2b. A portable electronic device is accepted in a pocket portion of the case as shown in FIG. 2a. FIG. 2b shows the case enclosing the electronic device. The case can be held in a closed position using many fastening devices such as a hook and loop fastener member, Velcro, magnetic force, and myriad other known techniques. FIG. 3 shows a snap device used to enclose the electronic device 2 within the case 1.

As shown in FIGS. 2a and 2b, the case 1 is made from a protective material 4. Additional protective materials and structures that are used according to the principles of the invention, to allow additional protection, include waterproof casings, electromagnetic insulating material, shock absorbent material, and the like. The protective material 4 maintains the electronic device 2 within the case 1.

The case 1 includes at least one controlling interface 6. The controlling interface is easily accessible by the user, and includes exterior user controls 7 that the user can manipulate to thereby operate the electronic device 2 contained within the case 1.

Figure 1:
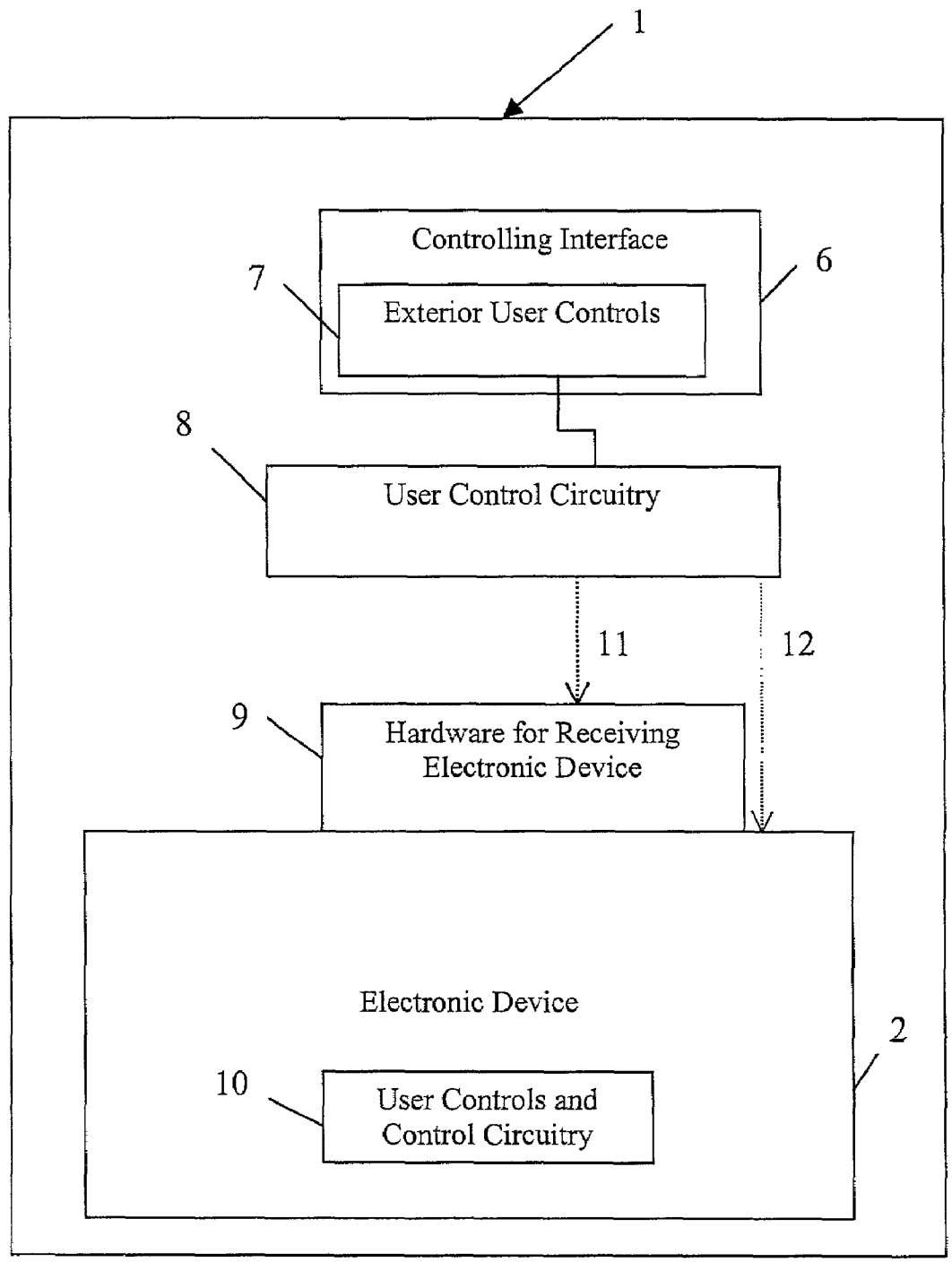
FIG. 1 diagrammatically shows how the controlling interface of the case of the present invention electrically communicates with the electronic device that is contained in the case.

FIG. 1 diagrammatically shows how the controlling interface 6 electrically communicates with the electronic device 2. The electronic device 2, having its own user controls and control circuitry 10 is received in the case 1. In one embodiment of the invention, hardware for receiving the electronic device such as a connection port 9 is integrally attached to the case 1, or to part of the material that makes up the case 1. The connection port 9 receives or is inserted into the electronic device 2 through an electrical connection plug/receiver construction (not shown). Through the electrical connection, signals are transferred (shown by arrow 11) between the electronic device 2 and the controlling interface 6 by way of user control circuitry 8 that is housed within the material that makes up the case 1.

According to another embodiment of the invention, electrical communication between the controlling interface and the electronic device can be at least in part carried out by way of wireless communication. Many wireless means of transferring signals are known, and can be applied to the present invention. The wireless transmission is exemplified by arrow 12. According to this embodiment, the hardware for receiving the electronic device 9 would either be eliminated altogether, or used for transferring only some of the signals between the user control circuitry 8 and the electronic device 2. Further, if all the signals between the electronic device 2 and the user control circuitry 8 are carried out by wireless means, the hardware for receiving the electronic device 9 could exclude any circuitry, and used solely for stabilizing the electronic device 2 within the case 1.

At least one electrical output jack 5 is integrally provided in the case 1. The electrical output jacks 5 typically include an audio output to accommodate a cord and plug 3 connected to a speaker, but can reasonably include a modem output or other communicative means. Other outputs could include a signal transmitter such as an IR transmitter or other commonly used transmission means for communicating between electronic devices. The output 5 could also be replaced with an output/input port if such is necessary for reception of signals from another electronic device.

An electrical input 13 can also be integrally provided in the case 1. The electrical input can receive AC or DC signals, by which power is provided to either operate the electronic device 2 or to provide a charge that can be stored using a rechargeable cell for future operation of the electronic device 2.

As mentioned above, it is somewhat frustrating for users to buy a portable electronic device, only to find out that a later produced model of the device better suits their needs. Users then face the dilemma of either buying another advanced version of the device, or to make do with their original purchase. According to the principles of the invention, the controlling interface 6 can be used as an upgraded set of controls. For example, the exterior user controls 7 located on the controlling interface 6 can produce numerous command signals, including command signals that operate functions that are not operated by the user controls and control circuitry 10 of the original electronic device 2. Thus, a user of the original electronic device 2 can avoid purchasing a new version of the electronic device by simply purchasing a less expensive protective case 1 that includes a controlling interface 6 similar to that of the new version of the electronic device. The case 1 consequently provides the advantages of upgrading the electronic device 2 as well as protecting the electronic device 2.

FIGS. 4a and 4b show another embodiment of the present invention, where the case 1 includes speakers 16 that are kept in a compartment of the case 1. The compartment in the figures is closed using a zipper 15. A handle 14 is provided to allow for easy handling of the case 1. It will be appreciated that the present invention is not limited to any of the exact constructions that have been described above and illustrated in the accompanying drawings, and that various modifications and changes can be made without departing from the scope and spirit thereof. It is intended that the scope of the invention only be limited by the appended claims.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A case for an electronic device, comprising:
   protective material for accepting said electronic device, said protective material enclosing said electronic device to maintain said electronic device within said case, the shape of said case when accepting said electronic device being different than said shape of said case when enclosing said electronic device;
   a controlling interface for handling electrical signals, said controlling interface having exterior user controls disposed on said protective material for manipulation by a user of said electronic device, said electronic device maintained within said case being controllable by said electrical signals from said exterior user controls; and
   user control circuitry for transferring said electrical signals between said electronic device and said controlling interface, said user control circuitry being mounted within said protective material,
   wherein said electronic device has user controls and control circuitry, said exterior user controls being separate from said user controls and control circuitry.

2. A case according to claim 1, wherein said electronic device is operable separate and apart from said case.

3. A case according to claim 1, wherein said electronic device is one of an audio device, a video device, a pager, a telephone, a camera, an electronic planner, and a computer processor.

4. A case according to claim 1, wherein said electronic device is enclosed within said case using one of a hook and loop fastener member, magnetic force, and a snap device.

5. A case according to claim 1, wherein said protective material includes one of a waterproof casing, electromagnetic insulating material, and shock absorbent material.

6. A case according to claim 1, wherein said exterior user controls produce command signals that operate functions that are not operated by the user controls and control circuitry.

7. A case according to claim 1, further comprising:
a pocket portion for accepting said electronic device, said electronic device being received within said pocket portion.

8. A case according to claim 1, further comprising:
a connection port attached to said case, said connection port receiving said electronic device or being inserted into said electronic device, said electrical signals being transferred between said electronic device and said controlling interface by way of said connection port.

9. A case according to claim 1, further comprising:
at least one audio speaker, enclosed within a compartment of said case, that receives audio signals from said controlling interface.

10. A case according to claim 1, wherein said controlling interface is used as an upgraded set of controls.

11. A case according to claim 10, wherein said controlling interface produces command signals that operate functions that are not operated by the user controls and control circuitry.

12. A case according to claim 1, wherein an electrical jack is integrally provided in said case.

13. A case according to claim 12, wherein said electrical jack comprises an audio output to accommodate a cord and plug connected to a speaker.

14. A case according to claim 12, wherein said electrical jack comprises a modem output.

15. A case according to claim 12, wherein said electrical jack comprises an electrical input by which power is provided to operate said electronic device.

16. A case according to claim 12, wherein said electrical jack comprises an electrical input through which power is provided to store a charge for said electronic device.

17. A case according to claim 1, wherein said electrical signals are wirelessly transferred between said controlling interface and said electronic device.

18. A method comprising:
accepting an electronic device within a case, said electronic device having user controls and control circuitry;
enclosing said electronic device within said case, the shape of said case when accepting said electronic device being different than said shape of said case when enclosing said electronic device;
disposing exterior user controls of a controlling interface on said case;
transferring electrical signals between said electronic device and said controlling interface; and
using said electrical signals from said exterior user controls to control said electronic device enclosed within said case,
wherein said exterior user controls are for manipulation by a user of said electronic device, and
wherein said exterior user controls are separate from said user controls and control circuitry.

19. A method according to claim 18, wherein said electronic device is operable separate and apart from said case.

20. A method according to claim 18, wherein said electronic device is one of an audio device, a video device, a pager, a telephone, a camera, an electronic planner, and a computer processor.

21. A method according to claim 18, wherein said exterior user controls produce command signals that operate functions that are not operated by the user controls and control circuitry.

22. A method according to claim 18, further comprising the step of:
using said controlling interface as an upgraded set of controls.

23. A method according to claim 22, wherein said controlling interface produces command signals that operate functions that are not operated by the user controls and control circuitry.

24. A case for an electronic device, comprising:
protective material for accepting said electronic device, said protective material using a fastening device to enclose said electronic device within said case, a hook and loop fastener member being used as said fastening device to enclose said electronic device within said case;
a controlling interface for handling electrical signals, said controlling interface having exterior user controls disposed on said protective material for manipulation by a user of said electronic device, said electronic device enclosed within said case being controllable by said electrical signals from said exterior user controls; and
user control circuitry for transferring said electrical signals between said electronic device and said controlling interface, said user control circuitry being mounted within said protective material,
wherein said electronic device has user controls and control circuitry, said exterior user controls being separate from said user controls and control circuitry.

25. A case according to claim 24, wherein said electronic device is operable separate and apart from said case.

* * * * *